Patented June 29, 1937

2,085,421

UNITED STATES PATENT OFFICE 2,085,421

TREATING AND STABILIZING WHEAT GERM

Peter John Donk and Alexander Ross Macdonald, Toronto, Ontario, Canada, assignors to Cerobrex Limited, Toronto, Ontario, Canada No Drawing. Application October 9, 1934, Serial No. 747,578. In Canada November 13, 1933

15 Claims. (Cl. 99—83)

This invention relates to new and useful improvements in processes of treating wheat germ so as to make it useful in the manufacture of bakery and other food products.

In the process of the manufacture of flour from the wheat grain or berry it has been found that unless the wheat germ is wholly or to a large extent removed in the process of grinding, the resultant flour is not satisfactory for production of bread and other products because—

(a) The keeping quality of the flour is impaired due to the fatty constituents of the germ (amounting to approximately 12% of its weight) becoming rancid due to or as a result of oxidation;

(b) The presence of the wheat germ is favorable to the growth of grain parasites such as weevils and molds;

(c) Of a streaky discoloration due to localization of the fatty constituents of the germ.

The wheat germ being relatively high in protein, and in mineral salts (primarily organic phosphates), and in valuable vitamins, all of which are important and desirable elements in a properly balanced diet and refined white flour as ordinarily used for bread being largely deficient in these elements, one of the principal objects of this invention is to make available for introduction into the ordinary bakers' mixture for bread an even larger proportion of wheat germ than is ordinarily present in the wheat grain or berry.

The mode we have followed in practicing our invention is—

*First.*—By grinding the fresh wheat germ as released in the flour mill in the process of milling the wheat berry to a fineness as closely approximating that of flour as the nature of the material permits with the primary object of disseminating to the greatest degree the moisture and the fatty constituents contained in the germ and with the secondary object of permitting the easy blending of the ground product with flour in subsequent baking operations. In practicing the invention we have found that this grinding operation should be carried on in a hammer or nutmeg grinder, i. e., a grinder in which the article is pulverized by impact. We have also found that good results are obtained by grinding the wheat berry so fine that it will pass a 120 mesh screen.

*Second.*—The admixture with the wheat germ either prior to, during, or subsequent to the process of grinding of sodium chloride or dry commercial baker's or dairy salt in suitable proportions, 5 to 8% by weight, of salt having been found effective. The purposes of admixing sodium chloride or possibly some other substance having the required characteristics are (a) To provide a ready absorbent for moisture which might otherwise be attracted by the ground germ and tend to promote rancidity;

(b) To inhibit a too rapid diastatic action of the yeast used in baking due to the presence of the known enzymes in the wheat germs and to compensate for the action of the enzymes of the germs.

*Third.*—By thereafter adding to the mixture of the finely ground wheat germ and sodium chloride or salt an inert non-fatty filler, similarly finely ground, such as potato flour. The proportion of the filler to the germ is 15–20% by weight and its purpose is:

(a) To absorb the fatty constituents of the wheat germ released by the grinding;

(b) Thereby to disseminate to a greater extent the said fatty constituents;

(c) So to occlude the said fatty constituents as to minimize exposure to oxidizing agents causing rancidity. Rice flour, rice polishings or corn flour may also be used as a filler though we have found potato flour best.

*Fourth.*—By heating the resultant mixture without free access of air or in a current of inert gas at a temperature and for a time sufficient thoroughly to dry it, the object being to remove such percentage of moisture as would promote rancidity. In practice, heating to a temperature of 200°–225° F. and preferably of 212° F. for twenty minutes in a closed oven has proved effective. The dehydration may also be performed prior to the adding of filler.

*Fifth.*—By packaging the said mixture as promptly as practicable, preferably while still warm, in containers being either (a) airtight; or (b) proof against free air circulation; or (c) airtight or proof against free air circulation but with the interstices filled with an inert gas such as carbon dioxide, nitrogen, etc.

While the mode of practicing the invention has been described in certain specific forms or manners, it will be obvious that the general principles herein disclosed may be varied, or embodied in different modes or processes from those described without departing from the spirit of the invention defined in following claims.

What is claimed is:

1. The process of treating wheat germ so as to produce a stabilized product free from rancidity and of good keeping quality, which comprises grinding the wheat germ, adding sodium chloride to absorb moisture and inhibit too rapid diastatic action of yeast, and adding and thoroughly mixing an inert non-fatty substance to act as a filler.

2. The process of treating wheat germ so as to produce a stabilized product free from rancidity and of good keeping quality, which comprises grinding the fresh wheat germ to about the consistency of flour, adding sodium chloride to absorb moisture and inhibit too rapid diastatic action of yeast, and adding and thoroughly mixing with the ground wheat germ and sodium chloride an inert non-fatty substance to act as a filler.

3. The process of treating wheat germ so as to produce a stabilized product free from rancidity and of good keeping quality, which comprises fine grinding the fresh wheat germ to about the consistency of flour, adding sodium chloride five to eight per centum by weight of the germ to absorb moisture and inhibit too rapid diastatic action of yeast, and adding and thoroughly mixing with the ground wheat germ and sodium chloride fifteen to twenty per centum by weight of an inert non-fatty substance to act as a filler.

4. The process of treating wheat germ so as to produce a stabilized product for use in the manufacture of bakery products, free from rancidity and of good keeping quality, which comprises mixing sodium chloride with the fresh wheat germ, fine grinding the mixture to about the consistency of flour, and adding thereto and thoroughly mixing therewith an inert non-fatty substance to act as a filler.

5. The process of treating wheat germ so as to produce a stabilized product for use in the manufacture of bakery products, free from rancidity and of good keeping quality, which comprises mixing sodium chloride with the fresh wheat germ, fine grinding the mixture to about the consistency of flour, adding thereto and thoroughly mixing therewith an inert non-fatty substance to act as a filler, and drying the resultant product.

6. The process of treating wheat germ so as to produce a stabilized product for use in the manufacture of bakery products, free from rancidity and of good keeping quality, which comprises mixing five to eight per centum by weight of sodium chloride with the fresh wheat germ, fine grinding the mixture to about the consistency of flour, adding thereto and thoroughly mixing therewith fifteen to twenty per centum by weight of an inert non-fatty substance to act as a filler, and drying the resultant product.

7. The process of treating wheat germ according to claim 1, characterized by drying the wheat germ by heat.

8. The process of treating wheat germ according to claim 1, characterized by drying the resultant product by heat without free access of air, and packaging the product while dry in containers proof against free air circulation.

9. The process of treating wheat germ according to claim 1, characterized by drying the resultant product by heat without free access of air, and packaging the same while dry in containers filled with an inert gas.

10. The process of treating wheat germ so as to produce a stabilized product for use in the manufacture of bakery products, free from rancidity and of good keeping quality, which comprises fine grinding the wheat germ to about the consistency of flour, mixing sodium chloride with the fresh germ to the extent of five to eight per centum by weight of the germ, adding thereto an inert non-fatty filler in the proportion of fifteen to twenty per centum by weight of the germ, thoroughly mixing the filler with the germ and sodium chloride, drying the product by heat at a temperature of 200°–225° F., and packaging the product while dry.

11. The process of treating wheat germ so as to produce a stabilized product for use in the manufacture of bakery products, free from rancidity and of good keeping quality, which comprises mixing sodium chloride with the fresh germ to the extent of five to eight per centum by weight of the germ, fine grinding the wheat germ and sodium chloride to about the consistency of flour, adding thereto an inert non-fatty filler in the proportion of fifteen to twenty per centum by weight of the germ, thoroughly mixing the filler with the germ and sodium chloride, drying the product by heat during said last mentioned mixing without free access of air at a temperature of 200°–225° F. for a period of approximately twenty minutes, and packaging the product while dry in containers proof against free air circulation.

12. A stabilized wheat germ product comprising finely ground fresh wheat germ mixed with salt and an inert non-fatty filler.

13. A stabilized fresh wheat germ product mixed with from 5–8 per centum by weight of salt and 15–20 per centum of an inert non-fatty filler.

14. The product according to claim 12 and in which the filler consists of potato flour.

15. The product according to claim 13 and in which the filler consists of potato flour.

PETER JOHN DONK.
ALEXANDER ROSS MACDONALD.